US006907073B2

(12) United States Patent
Sawhney et al.

(10) Patent No.: US 6,907,073 B2
(45) Date of Patent: Jun. 14, 2005

(54) TWEENING-BASED CODEC FOR SCALEABLE ENCODERS AND DECODERS WITH VARYING MOTION COMPUTATION CAPABILITY

(75) Inventors: Harpreet Singh Sawhney, West Windsor, NJ (US); Rakesh Kumar, Monmouth Junction, NJ (US); Keith Hanna, Princeton, NJ (US); Peter Burt, Princeton, NJ (US); Norman Winarsky, Princeton, NJ (US)

(73) Assignee: Sarnoff Corporation, Princeton, NJ (US)

( * ) Notice: Subject to any disclaimer, the term of this patent is extended or adjusted under 35 U.S.C. 154(b) by 596 days.

(21) Appl. No.: 09/731,194

(22) Filed: Dec. 6, 2000

(65) Prior Publication Data

US 2001/0031003 A1 Oct. 18, 2001

Related U.S. Application Data

(60) Provisional application No. 60/172,841, filed on Dec. 20, 1999.

(51) Int. Cl.[7] .................................................. H04B 1/66
(52) U.S. Cl. .................................................. 375/240.14
(58) Field of Search ........................ 375/240.01, 240.03, 375/240.15, 240.16, 240.12, 240.11, 240.14, 240.09, 240.22, 240.23, 240.25, 240.13; 382/234, 236, 238, 250; H04B 1/66

(56) References Cited

U.S. PATENT DOCUMENTS 5,121,202 A * 6/1992 Tanoi ..................... 375/240.16
5,677,735 A   10/1997 Ueno et al.

(Continued)

FOREIGN PATENT DOCUMENTS

EP          0 305 127 A2    3/1989

(Continued)

OTHER PUBLICATIONS

"The Motion Transform: A New Motion Compensation Technique", by Armitano, R. M. et al; IEEE International Conference on Acoustics, Speech, and Signal Processing Proceedings, vol. CONF. 21, May 7, 1996, pp. 2295–2298.
Patent Abstracts of Japan, vol. No. 14, Dec. 31, 1998 and JP 10 257502 A, Matsushita Electric Ind Co Ltd, Sep. 25, 1998 abstract.

Primary Examiner—Tung Vo
(74) Attorney, Agent, or Firm—William J. Burke

(57) ABSTRACT

A scaleable video encoder has one or more encoding modes in which at least some, and possibly all, of the motion information used during motion-based predictive encoding of a video stream is excluded from the resulting encoded video bitstream, where a corresponding video decoder is capable of performing its own motion computation to generate its own version of the motion information used to perform motion-based predictive decoding in order to decode the bitstream to generate a decoded video stream. All motion computation, whether at the encoder or the decoder, is preferably performed on decoded data. For example, frames may be encoded as either H, L, or B frames, where H frames are intra-coded at full resolution and L frames are intra-coded at low resolution. The motion information is generated by applying motion computation to decoded L and H frames and used to generate synthesized L frames. L-frame residual errors are generated by performing inter-frame differencing between the synthesized and original L frames and are encoded into the bitstream. In addition, synthesized B frames are generated by tweening between the decoded H and L frames and B-frame residual errors are generated by performing inter-frame differencing between the synthesized B frames and, depending on the implementation, either the original B frames or sub-sampled B frames. These B-frame residual errors are also encoded into the bitstream. The ability of the decoder to perform motion computation enables motion-based predictive encoding to be used to generate an encoded bitstream without having to expend bits for explicitly encoding any motion information.

35 Claims, 5 Drawing Sheets

U.S. PATENT DOCUMENTS

| | | | | |
|---|---|---|---|---|
| 5,686,962 A | * | 11/1997 | Chung et al. | 375/240.16 |
| 5,703,649 A | * | 12/1997 | Kondo | 375/240.18 |
| 5,764,805 A | * | 6/1998 | Martucci et al. | 382/238 |
| 5,852,469 A | * | 12/1998 | Nagai et al. | 375/240.23 |
| 6,097,842 A | * | 8/2000 | Suzuki et al. | 382/232 |
| 6,427,027 B1 | * | 7/2002 | Suzuki et al. | 382/236 |
| 6,490,705 B1 | * | 12/2002 | Boyce | 714/776 |
| 6,535,558 B1 | * | 3/2003 | Suzuki et al. | 375/240.12 |
| 6,563,549 B1 | * | 5/2003 | Sethuraman | 348/700 |

FOREIGN PATENT DOCUMENTS

| | | |
|---|---|---|
| EP | 0 753 970 A2 | 1/1997 |
| EP | 0 920 214 A2 | 6/1999 |
| WO | WO 93/02526 | 2/1993 |
| WO | WO 99/57906 | 11/1999 |

\* cited by examiner

TWEENING-BASED CODEC FOR SCALEABLE ENCODERS AND DECODERS WITH VARYING MOTION COMPUTATION CAPABILITY

CROSS-REFERENCE TO RELATED APPLICATIONS

This application claims the benefit of the filing date of U.S. provisional application No. 60/172,841, filed on Dec. 20, 1999.

BACKGROUND OF THE INVENTION

1. Field of the Invention

The present invention relates to video compression/decompression (codec) processing.

2. Description of the Related Art

Traditional video compression/decompression processing relies on asymmetric computation between the encoder and decoder. The encoder is used to do all the analysis of the video stream in terms of inter- and intra-frame components, including block-based motion computation, and also in terms of object-based components. The analysis is used to compress static and dynamic information in the video stream. The decoder simply decodes the encoded video bitstream by decompressing the intra- and block-based inter-frame information. No significant analysis is performed at the decoder end. Examples of such codecs include MPEG1, MPEG2, MPEG4, H.263, and related standards. The quality of "codeced" video using the traditional asymmetric approach is reasonably good for data rates above about 1.2 megabits/second (Mbps). However, the typical quality of output video is significantly degraded at modem speeds of 56 kilobits/second (Kbps) and even at speeds as high as a few 100 Kbps.

SUMMARY OF THE INVENTION

The present invention is related to video compression/decompression processing that involves analysis of the video stream (e.g., motion computation) at both the encoder end and the decoder end. With the rapid increase in processing power of commonly available platforms, and with the potential for dedicated video processing sub-systems becoming viable, the techniques of the present invention may significantly influence video delivery on the Internet and other media at low and medium bit-rate channels.

In traditional video compression, any and all motion computation is performed by the encoder, and none by the decoder. For example, in a conventional MPEG-type video compression algorithm, for predictive frames, the encoder performs block-based motion estimation to identify motion vectors that relate blocks of data in a current frame to closely matching blocks of reference data for use in generating motion-compensated inter-frame differences. These inter-frame differences (also referred to as residual errors) along with the motion vectors themselves are explicitly encoded into the resulting encoded video bitstream. Under this codec paradigm, without having to perform any motion computation itself, a decoder recovers the motion vectors and inter-frame differences from the bitstream and uses them to generate the corresponding frames of a decoded video stream. As used in this specification, the term "motion computation" refers to motion estimation and other types of analysis in which motion information for video streams is generated, as opposed to motion compensation, where already existing motion information is merely applied to video data.

According to certain embodiments of the present invention, a video decoder is capable of performing at least some motion computation. As such, the video encoder can omit some or all of the motion information (e.g., motion vectors) from the encoded video bitstream, relying on the decoder to perform its own motion computation analysis to generate the equivalent motion information required to generate the decoded video stream. In this way, more of the available transmission and/or storage capacity (i.e., bit rate) can be allocated for encoding the residual errors (e.g., inter-frame differences) rather than having to expend bits to encode motion information.

According to one embodiment, the present invention is a method for encoding a video stream to generate an encoded video bitstream, comprising the steps of (a) encoding, into the encoded video bitstream, a first original frame/region in the video stream using intra-frame coding to generate an encoded first frame/region; and (b) encoding, into the encoded video bitstream, a second original frame/region in the video stream using motion-based predictive coding, wherein at least some motion information used during the motion-based predictive coding is excluded from the encoded video bitstream.

According to another embodiment, the present invention is a video encoder for encoding a video stream to generate an encoded video bitstream, comprising (a) a frame/region type selector configured for selecting different processing paths for encoding different frames/regions into the encoded video bitstream; (b) a first processing path configured for encoding, into the encoded video bitstream, a first original frame/region in the video stream using intra-frame coding to generate an encoded first frame/region; and (c) a second processing path configured for encoding, into the encoded video bitstream, a second original frame/region in the video stream using motion-based predictive coding, wherein the video encoder has an encoding mode in which at least some motion information used during the motion-based predictive coding is excluded from the encoded video bitstream.

According to yet another embodiment, the present invention is a method for decoding an encoded video bitstream to generate a decoded video stream, comprising the steps of (a) decoding, from the encoded video bitstream, an encoded first frame/region using intra-frame decoding to generate a decoded first frame/region; and (b) decoding, from the encoded video bitstream, an encoded second frame/region using motion-based predictive decoding, wherein at least some motion information used during the motion-based predictive decoding is generated by performing motion computation as part of the decoding method.

According to yet another embodiment, the present invention is a video decoder for decoding an encoded video bitstream to generate a decoded video stream, comprising (a) a frame/region type selector configured for selecting different processing paths for decoding different encoded frames/regions from the encoded video bitstream; (b) a first processing path configured for decoding, from the encoded video bitstream, an encoded first frame/region in the video stream using intra-frame decoding to generate a decoded first frame/region; and (c) a second processing path configured for decoding, from the encoded video bitstream, an encoded second frame/region in the video stream using motion-based predictive decoding, wherein the video decoder has a decoding mode in which at least some motion information used during the motion-based predictive decoding is generated by the video decoder performing motion computation.

According to yet another embodiment, the present invention is a method for decoding an encoded video bitstream to generate a decoded video stream, comprising the steps of (a) decoding, from the encoded video bitstream, a plurality of encoded frames/regions to generate a plurality of decoded frames/regions using motion information; and (b) performing tweening based on the motion information to insert one or more additional frames/regions into the decoded video stream.

According to yet another embodiment, the present invention is a decoder for decoding an encoded video bitstream to generate a decoded video stream, comprising (a) one or more processing paths configured for decoding, from the encoded video bitstream, a plurality of encoded frames/regions to generate a plurality of decoded frames/regions using motion information; and (b) an additional processing path configured for performing tweening based on the motion information to insert one or more additional frames/regions into the decoded video stream.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Figure 1:
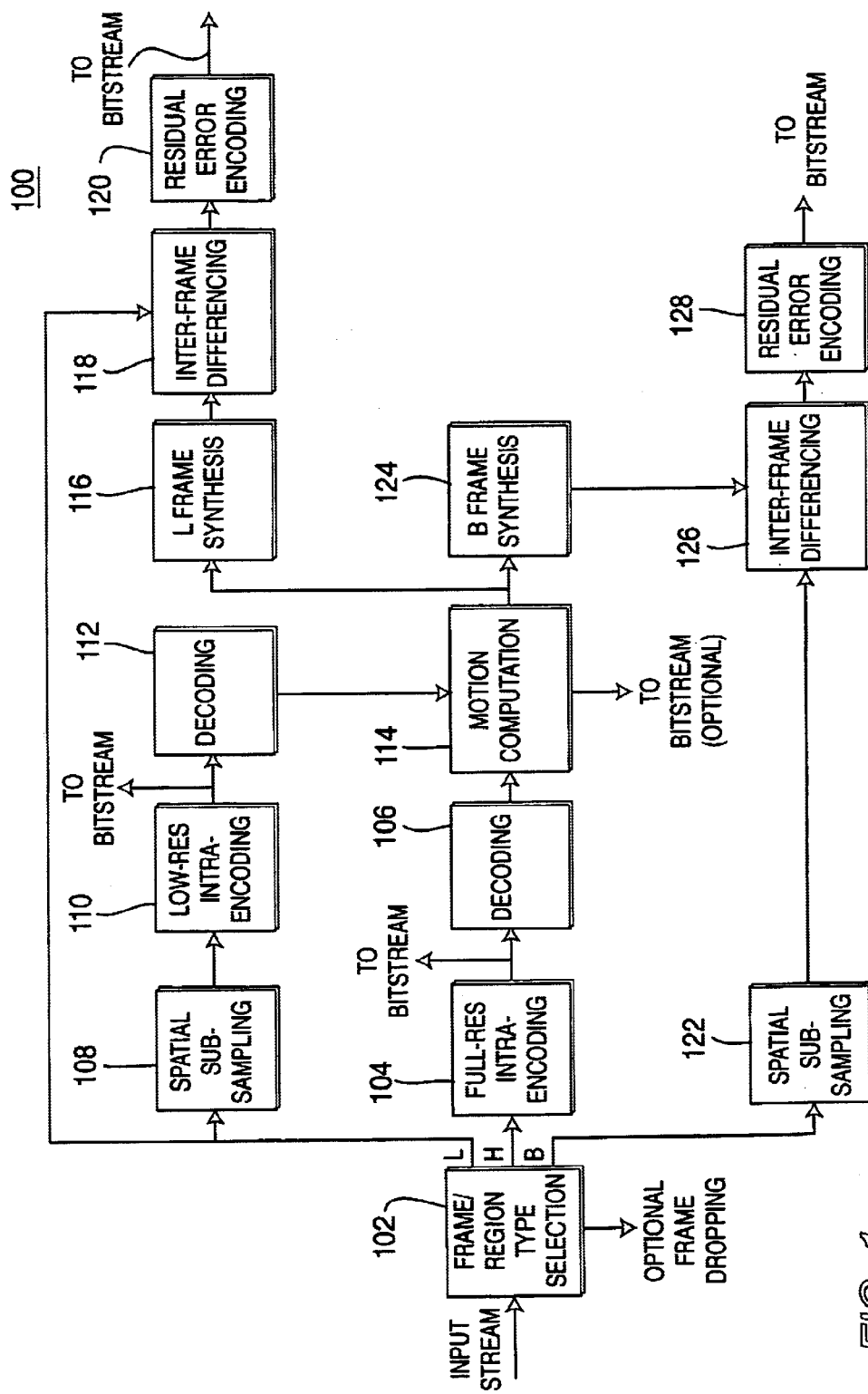
FIG. 1 shows a block diagram of a scaleable video encoder, according to one embodiment of the present invention.

In current state-of-the-art motion video encoding algorithms, like those of the MPEGx family, a large part of the bit budget and hence the bandwidth is consumed by the encoding of motion vectors and error images for the non-intra-coded frames. In a typical MPEG2 coded stream, approximately 5% of the bit budget is used for overhead, 10–15% is for intra-coded frames (i.e., frames that are coded as stills), 20–30% is for motion vectors, and 50–65% of the budget is for error encoding. The relatively large budget for error encoding can be attributed to two main reasons. First, motion vectors are computed only as a translation vector for (8×8) blocks or (16×16) macroblocks, and, second, the resulting errors tend to be highly uncorrelated and non-smooth.

According to certain embodiments of the present invention, motion computation is performed at both the encoder end and the decoder end. As such, motion information (e.g., motion vectors) need not be transmitted. Since motion computation is performed at the decoder end, instead of limiting the representation of motion to block-based translations, motion fields can be computed with greater accuracy using a combination of parametric and non-parametric representations.

Embodiments of the present invention enable the video stream to be sub-sampled both temporally and spatially at the encoder. The video stream can be sub-sampled in time so that not all of the frames are transmitted. In addition, some of the frames that are transmitted may be coded at a lower spatial resolution. Using dense and accurate motion computation at the decoder end, the decoded full-resolution and low-resolution frames are used to recreate a full-resolution decoded video stream with missing frames filled in using motion-compensated spatio-temporal interpolation (also referred to as "tweening"). This could result in large savings in compression while maintaining quality of service for a range of different bandwidth pipes.

In one embodiment of the present invention, a scaleable encoder is capable of encoding input video streams at a number of different encoding modes corresponding to different types of decoders, e.g., having different levels of processing capacity.

At one extreme class of encoding modes, the encoder generates an encoded video bitstream for a decoder that is capable of performing all of the motion computation performed by the encoder. In that case, the encoder encodes the video stream using an encoding mode in which motion-based predictive encoding is used to encode at least some of the frames in the video stream, but none of the motion information used during the video compression processing is explicitly included in the resulting encoded video bitstream. The corresponding decoder performs its own motion computation during video decompression processing to generate its own version of the motion information for use in generating a decoded video stream from the encoded video bitstream, without having to rely on the bitstream explicitly carrying any motion information.

At the other extreme class of encoding modes, the encoder encodes the video stream for a decoder that is incapable of performing any motion computation (as in conventional video codecs). In that case, if the encoder uses any motion information during encoding (e.g., for motion-compensated inter-frame differencing), then all of that motion information is explicitly encoded into the encoded video bitstream. The corresponding decoder recovers the encoded motion information from the encoded video bitstream to generate a decoded video stream without having to perform any motion computation on its own.

In between these two extremes are a number of different encoding modes that are geared towards decoders that perform some, but not all of the motion computation performed by the encoder. In these situations, the encoder explicitly encodes some, but not all of the motion information used during its motion-based predictive encoding, into the resulting video bitstream. The corresponding decoder recovers the encoded motion information from the bitstream and performs its own version of motion computation to generate the rest of the motion information used to generate a decoded video stream.

Independent of how much motion information is to be encoded into the bitstream, a scaleable encoder of the present invention is also capable of skipping frames with the expectation that the decoder will be able to insert frames into the decoded video stream during playback. Depending on the implementation, frame skipping may involve providing at least some header information for skipped frames in the encoded video bitstream or even no explicit information at all.

Encoding

FIG. 1 shows a block diagram of a scaleable video encoder 100, according to one embodiment of the present invention. Scaleable video encoder 100 will first be described in the context of an extreme encoding mode in which none of the motion information used during motion-based predictive encoding is explicitly encoded into the resulting encoded video bitstream. Other encoding modes will then be described.

According to this extreme encoding mode, each frame in an input video stream is encoded as either an H frame, an L frame, or a B frame. Each H frame is intra-encoded as a high spatial resolution (e.g., full-resolution) key frame, each L frame is intra-encoded as a low spatial resolution (e.g., ¼×¼ resolution) key frame augmented by residual error encoding, and each B frame is inter-encoded as a low spatial resolution frame based on motion estimates between sets of H and/or L frames. Video encoder 100 encodes an input video stream as a sequence of H, L, and B frames to form a corresponding output encoded video bitstream.

Figure 2:
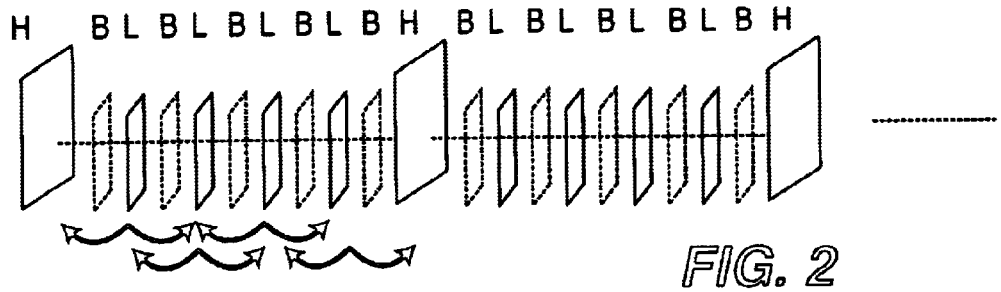
FIG. 2 shows a representation of the encoding of an input video stream by the video encoder of FIG. 1.

FIG. 2 shows a representation of a particular example of the encoding of an input video stream by video encoder 100 of FIG. 1. In the example of FIG. 2, the input video stream is encoded using a repeating 10-frame sequence of (HBLBLBLBLB). In general, however, other fixed or even adaptive frame sequences are possible. For example, in one preferred fixed frame sequence, a 30 frame/second (fps) video stream is encoded using the fixed 30-frame sequence of:

(HBBBBBLBBBBBLBBBBBLBBBBBLBBBBB).

The generation of the frame-type sequence may also be performed adaptively, e.g., based on the amount of motion present across frame, with fewer B frames between consecutive H/L key frames and/or fewer L frames between consecutive H frames when motion is greater and/or less uniform, and vice versa.

Referring again to FIG. 1, type selection 102 is applied to the input video stream to determine which frames in the video stream are to be encoded as H, L, and B frames. (Although this type selection 102 will be described in the context of entire frames, this process may also be implemented based on regions within a frame, such as square blocks, rectangular regions, or even arbitrary shaped regions, with the corresponding estimation and encoding applied to each.) As mentioned above, depending on the particular implementation, the frame-type selection may be based on a fixed frame sequence or an appropriate adaptive selection algorithm, e.g., based on motion magnitude, special effects, scene cuts, and the like. Each of the different types of frames is then processed along a corresponding processing path represented in FIG. 1. As shown in FIG. 1, an option exists to drop one or more frames from the input video stream. This optional frame dropping may be incorporated into a fixed frame sequence or adaptively selected, e.g., based on the amount of motion present or bit-rate considerations.

Figure 3:
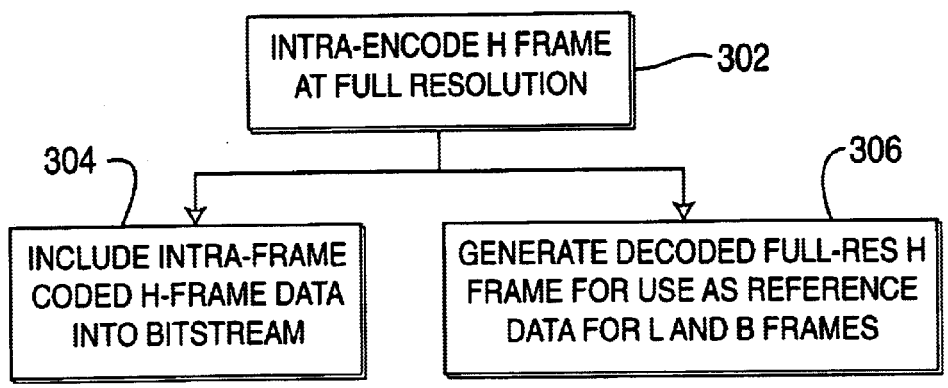
FIG. 3 shows a flow diagram of the processing of each H frame by the video encoder of FIG. 1.

FIG. 3 shows a flow diagram of the processing of each H frame by video encoder 100 of FIG. 1. Referring to the blocks in FIG. 1 and the steps in FIG. 3, the current H frame is intra-encoded at full resolution, e.g., using wavelet encoding (block 104 of FIG. 1 and step 302 of FIG. 3). As is known in the art, wavelet encoding typically involves the application of wavelet transforms to different sets of pixel data corresponding to regions within a current frame, followed by quantization, run-length encoding, and variable-length (Huffman-type) encoding to generate the current frame's contribution to the encoded video bitstream. Typically, the sizes of the regions of pixel data (and therefore the sizes of the wavelet transforms) vary according to the pixel data itself. In general, the more uniform the pixel data, the larger the size of a region that is encoded with a single wavelet transform. Note that even though this encoding is referred to as "full resolution," it may still involve sub-sampling of the color components (e.g., 4:1:1 YUV sub-sampling).

The resulting intra-encoded full-resolution H-frame data is incorporated into the encoded video bitstream (step 304). The same intra-encoded H-frame data is also decoded (block 106 and step 306), e.g., using wavelet decoding, to generate a full-resolution decoded H frame for use as reference data for encoding L and B frames.

Figure 4:
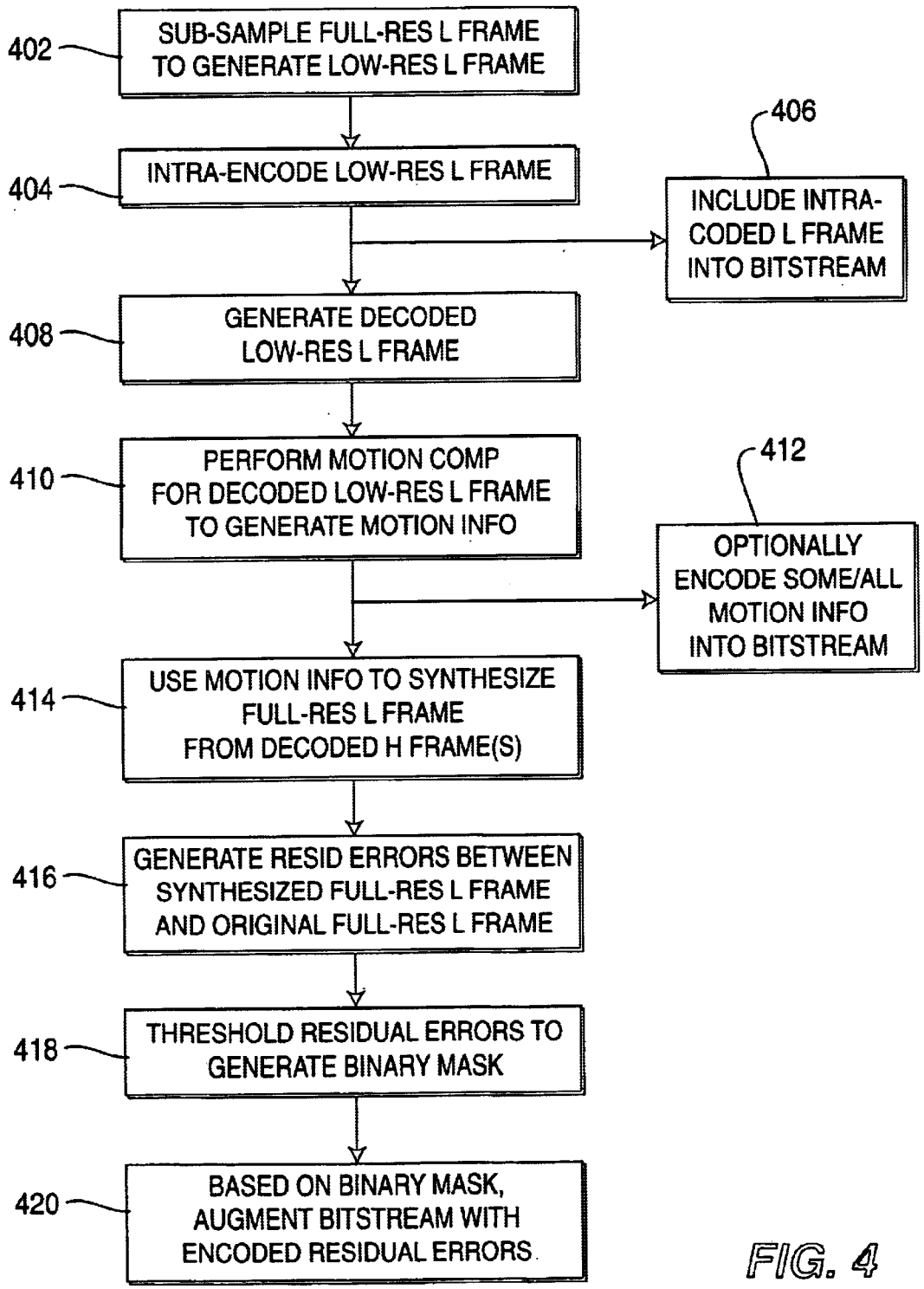
FIG. 4 shows a flow diagram of the processing of each L frame by the video encoder of FIG. 1.

FIG. 4 shows a flow diagram of the processing of each L frame by video encoder 100 of FIG. 1. Referring to the blocks in FIG. 1 and the steps in FIG. 4, the current full-resolution L frame is spatially sub-sampled (e.g., by a factor of 4 in each direction) to generate a corresponding low-resolution L frame (block 108 and step 402). Depending on the particular implementation, this spatial sub-sampling may be based on any suitable technique, such as simple decimation or more complicated averaging.

The low-resolution L frame is then intra-encoded (block 110 and step 404), e.g., using wavelet encoding, and the resulting intra-encoded low-resolution L-frame data is incorporated into the encoded video bitstream (step 406). The same intra-encoded L-frame data is also decoded to generate a decoded low-resolution L frame (block 112 and step 408).

Motion computation analysis is then performed comparing the decoded low-resolution L-frame data to one or more other sets of decoded data (e.g., decoded full-resolution data corresponding to the previous and/or subsequent H frames and/or decoded low-resolution data corresponding to the previous and/or subsequent L frames) to generate motion information for the current L frame (block 114 and step 410). In this particular "extreme" encoding mode, none of this L-frame motion information is explicitly encoded into the encoded video bitstream. In other encoding modes (including the opposite "extreme" encoding mode), some or all of the motion information is encoded into the bitstream (step 412).

The exact type of motion computation analysis performed depends on the particular implementation of video encoder 100. For example, motion may be computed for each L frame based on either the previous H frame, the closest H frame, or the previous key (H or L) frame. Moreover, this motion computation may range from conventional MPEG-like block-based or macroblock-based algorithms to any of a combination of optical flow, layered motion, and/or multi-frame parametric/non-parametric algorithms.

For example, in one implementation, video encoder 100 may perform conventional forward, backward, and/or bi-directional block-based motion estimation in which a motion vector is generated for each (8×8) block or (16×16) macroblock of pixels in the current frame. In alternative embodiments, other types of motion computation analysis may be performed, including optical flow analysis in which a different motion vector is generated for each pixel in the current frame. (For those encoding modes in which some or all of the motion information is encoded into the bitstream, the optical flow can be compactly represented using either wavelet encoding or region-based parametric plus residual flow encoding.) Still other implementations may rely on hierarchical or layered motion analysis in which a number of different motion vectors are generated at different resolutions, where finer motion information (e.g., corresponding to smaller sets of pixels) provide corrections to coarser motion information (e.g., corresponding to larger sets of pixels). In any case, the resulting motion information characterizes the motion between the current L frame and corresponding H/L frames.

No matter what type of analysis is performed, the motion information generated during the motion computation is then used to synthesize a full-resolution L frame (block 116 and step 414). In particular, the motion information is used to warp (i.e., motion compensate) the corresponding decoded full-resolution H frame to generate a synthesized full-resolution frame corresponding to the current L frame. Note that the synthesized full-resolution L frame may be generated using forward, backward, or even bi-directional warping based on more than one decoded full-resolution H frame. This would require computation of motion information relative to two different decoded full-resolution H frames, but will typically reduce even further the corresponding residuals that need to be compressed.

In general, the synthesized full-resolution L frame may have artifacts due to various errors in motion computation due to occlusions, mismatches, and the like. As such, a quality of alignment metric (e.g., based on pixel-to-pixel absolute differences) is generated between the synthesized full-resolution L frame and the original full-resolution L frame (block 118 and step 416). The quality of alignment metrics form an image of residual errors that represent the quality of alignment at each pixel.

The residual errors are then encoded for inclusion into the encoded video bitstream (block 120). In one implementation, the image of residual errors is thresholded at an appropriate level to form a binary mask (step 418) that identifies those regions of pixels for whom the residual error should be encoded, e.g., using a wavelet transform, for inclusion into the encoded video bitstream (step 420). For typical video processing, the residual errors for only about 10% of the pixels will be encoded into the bitstream.

Figure 5:
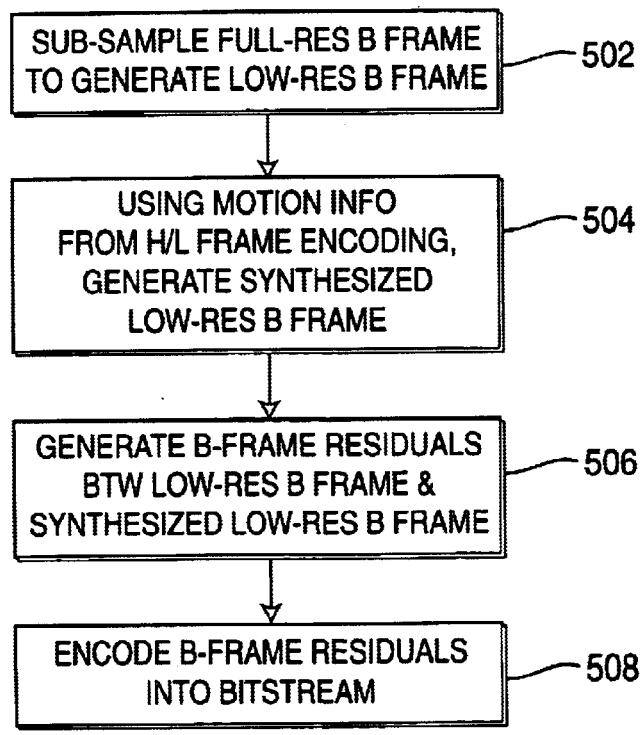
FIG. 5 shows a flow diagram of the processing of each B frame by the video encoder of FIG. 1.

FIG. 5 shows a flow diagram of the processing of each B frame by video encoder 100 of FIG. 1. Referring to the blocks in FIG. 1 and the steps in FIG. 5, the current full-resolution B frame is spatially sub-sampled (e.g., by a factor of 4 in each direction) to generate a corresponding low-resolution B frame (block 122 and step 502). The low-resolution motion information generated based on the decoded H/L frame by block 114 is used to perform interpolated motion compensation to synthesize a low-resolution frame for the current B frame (block 124 and step 504). In particular, the motion information generated by block 114 (i.e., corresponding to the motion between the decoded H/L frame immediately preceding the current B frame and the decoded H/L frame immediately following the current B frame) is temporally interpolated to generate motion information for the current B frame. This temporally interpolated motion information is then used to perform forward, backward, or bi-directional motion compensation on those previous and subsequent decoded H/L frames to generate the synthesized low-resolution B frame. This process of generating a synthesized B frame using temporally interpolated motion compensation is referred to as "tweening."

Inter-frame differencing is then applied between the spatially sub-sampled B frame and the low-resolution synthesized B frame to generate low-resolution residual errors for the current B frame (block 126 and step 506), which residual errors are then encoded, e.g., using wavelet encoding, to generate encoded B-frame residual data for inclusion in the encoded video bitstream (block 128 and step 508). Depending on the particular implementation, the residual error encoding of block 128 may rely on a thresholding of B-frame inter-frame differences to determine which residuals to encode, similar to that described previously with regard to block 120 for the L-frame residual errors. Note that, since B frames are never used to generate reference data for encoding other frames, video encoder 100 does not have to decode the encoded B-frame residual data.

In an alternative implementation of video encoder 100, instead of synthesizing low-resolution B frames, full-resolution B frames can be synthesized by tweening between pairs of decoded full-resolution H frames generated by block 106 and synthesized full-resolution L frames generated by block 116. Inter-frame differencing can then be applied between the original full-resolution B frames and the synthesized full-resolution B frames to generate residual errors that can be encoded, e.g., using wavelet encoding, into the encoded video bitstream. In that case, the spatial sub-sampling of block 122 can be omitted.

As mentioned earlier, the processing in FIGS. 3–5 correspond to the extreme encoding mode in which video encoder 100 performs motion-based predictive encoding, but none of the corresponding motion information is explicitly encoded into the resulting encoded video bitstream, where the decoder performs its own motion computation to generate its own version of the motion information for use in generating the corresponding decoded video stream. As mentioned earlier, video encoder 100 is preferably a scaleable video encoder that can encode video streams at a variety of different encoding modes. Some of the encoding options available in video encoder 100 include:

Encoding frames as either H or L frames, without using any B frames;

Dropping one or more B frames, while relying on the video decoder to reconstruct dropped B frames by tweening between appropriate encoded frames without relying on encoded residuals for those B frames;

Encoding L frames using low-resolution intra-encoding without explicitly encoding residual errors corresponding to errors in synthesized L frames;

Encoding L frames using predictive encoding; and

Encoding some or even all of the motion information explicitly into the encoded video bitstream.

Of course, if some or all of the motion information is to be explicitly encoded into the bitstream, the video encoder will need to be implemented with appropriate processing modules for encoding that motion information into the encoded video bitstream. In one possible encoding mode that generates hierarchical or layered motion information, the encoder explicitly includes only coarse motion information in the encoded video bitstream. In that case, the decoder recovers the coarse motion information and then performs its own motion computation to generate the rest of the motion information (e.g., fine or full-precision motion information). The exact combination of encoding options to select for a particular input video stream will depend on the computational power of the decoder, the particular decompression algorithm implemented in the decoder, the transmission and/or storage requirements (i.e., bit-rate requirements) for the encoded video bitstream, and/or the required spatial and/or temporal quality of the decoded video stream.

Variable Bit-Rate Adaptive Encoding

Scaleable video encoder 100 of FIG. 1 is highly amenable to adaptive variable bit-rate encoding. The decision to increase or decrease the temporal sampling rates of frames can be based on the magnitude of motion present between frames. Also, this decision can be based on the type of motion between frames. For example, if within a clip motion can be captured quite adequately using global parametric transformations (e.g., camera pans), the sampling of frames may be coarser. If the motion is complex and of high magnitude, then sampling may need to be finer.

Furthermore, as mentioned previously, the nomenclature of H, L, and B frames can be generalized so that it is applied at the level of regions within an image in addition to the frame level. This implies that frames can be divided into regions of varying motion magnitude, where regions of large motion may be encoded more often than regions of smaller motion. This decision can be based both on the size of and magnitude of motion within a region. Therefore, typically a single frame may consist of regions encoded at the full resolution, regions encoded at lower resolutions, and regions that are created by forward and backward tweening of nearby frames.

Adaptive Encoding of Motion

Although motion encoding is avoided in some encoding modes, motion can be selectively encoded to gain efficiency in the process. The decoder may be able to work at faster rates if motion estimates for seeding the precise motion computation are available. Since the present invention is not limited to block-based motion computation, the computation of the motion field between frames can be decomposed into multiple resolutions. At the coarsest level, there may be a global parametric field transformation for the whole frame. At finer levels, the motion may be encoded either as a flow field or local parametric transformation at an appropriate resolution. The parametric transformation can be encoded almost for free. The coarse motion fields may also be encoded using wavelet encoding.

In general, motion encoding is an option for video encoder 100 and can be used to enhance the time performance of the decoder. If some motion fields are provided to the decoder in the bitstream, then the decoder can refine the motion field further instead of starting from scratch.

Encoding the Interpolation Model for Tweening

Another piece of information that the encoder may compute is an appropriate model of tweening for the B frames. Since the decoder will use nearby H and L frames to compute the B frames using tweening, the encoder can guide the decoder about the optimum model for interpolation. By computing models of motion change over a full frame/field, or within adaptive windows, the encoder can direct the decoder to use various interpolation models suited for the data at hand, including linear, quadratic, cubic, and even higher-order interpolation models.

Decoding

As suggested earlier, the decoding algorithm for an encoded video bitstream generated using scaleable video encoder 100 of FIG. 1 depends on the particular encoding mode used to generate that encoded video bitstream. This section is directed primarily towards the decoding algorithm corresponding to the "extreme" encoding mode represented in FIGS. 1 and 3–5, where no motion information is explicitly encoded into the bitstream. Other decoding algorithms would be appropriately tailored to the other encoding modes.

Referring again to FIG. 1, video encoder 100 performs motion computation only on decoded data. In particular, the motion computation of block 114 is applied to decoded full-resolution H frames and/or decoded low-resolution L frames. Since the identical decoded data is generated at the video decoder, the decoder is able to reconstruct the same motion information that was available at the encoder by performing its own motion computation analysis. This is not possible for prior art decoders, since conventional lossy codec algorithms call for motion computation to be applied to the original input image data, which is not available at the decoder.

The video decoder almost exactly mirrors the analysis and synthesis performed by the encoder. Instead of using the synthesized full-resolution frames only for encoding, the decoder creates the full-resolution video stream. The encoding process dictates the decoding process. Motion is computed between the decoded low-resolution L frames and the closest decoded H frames. Full-resolution L frames are synthesized by warping the relevant decoded H frame using the computed motion information. In addition, areas of misalignment are detected as at the encoder, and these are filled in using the encoded full-resolution L-frame residuals. This process generates a sequence of decoded H and L frames at full resolution. B frames are generated using the neighboring decoded H and L frames. If B-frame residuals are available from the bitstream, they are used to fill in the areas of misalignment in the B frames.

B frames are generated by tweening between appropriate decoded H and synthesized L frames. There are a number of different models of flow interpolation that tweening can employ. Constant velocity, constant acceleration, and adaptive models within given windows are just some of the choices that may be used. In addition, since the encoder can afford to compute motion information between every pair of frames, the encoded stream may be enhanced to contain information about the optimum interpolation model for flow that the decoder should use. For example, if the motion is mostly a camera pan, then constant translation-based interpolation will suffice. Camera pan along with a significantly moving object may require two different interpolation models within the same frame. Such information can easily be encoded at the encoder end, since decisions about adaptive motion encoding need to be made anyway. The decoder will use the appropriate model for tweening.

It is assumed that the decoder and the encoder both have the capability to compute motion fields. This is not unreasonable at the decoder end given the rapidly increasing processing power of standard computing platforms. Furthermore, this provides a unique opportunity to create a commodity-level video processor that may be included into every computing platform and set-top box.

Furthermore, the computed motion fields at the decoder end may be used to interpolate new frames and create sequences with higher frame rates and also to synthesize higher-resolution video frames.

If the encoded frames contain H, L, and B labels for regions within a frame in addition to the frames, then the decoder again mirrors the encoder's computation. It synthesizes a single frame by appropriately choosing high-resolution decoding for the H regions, motion-based synthesis of L regions, and tweening-based synthesis of B regions.

Figure 6:
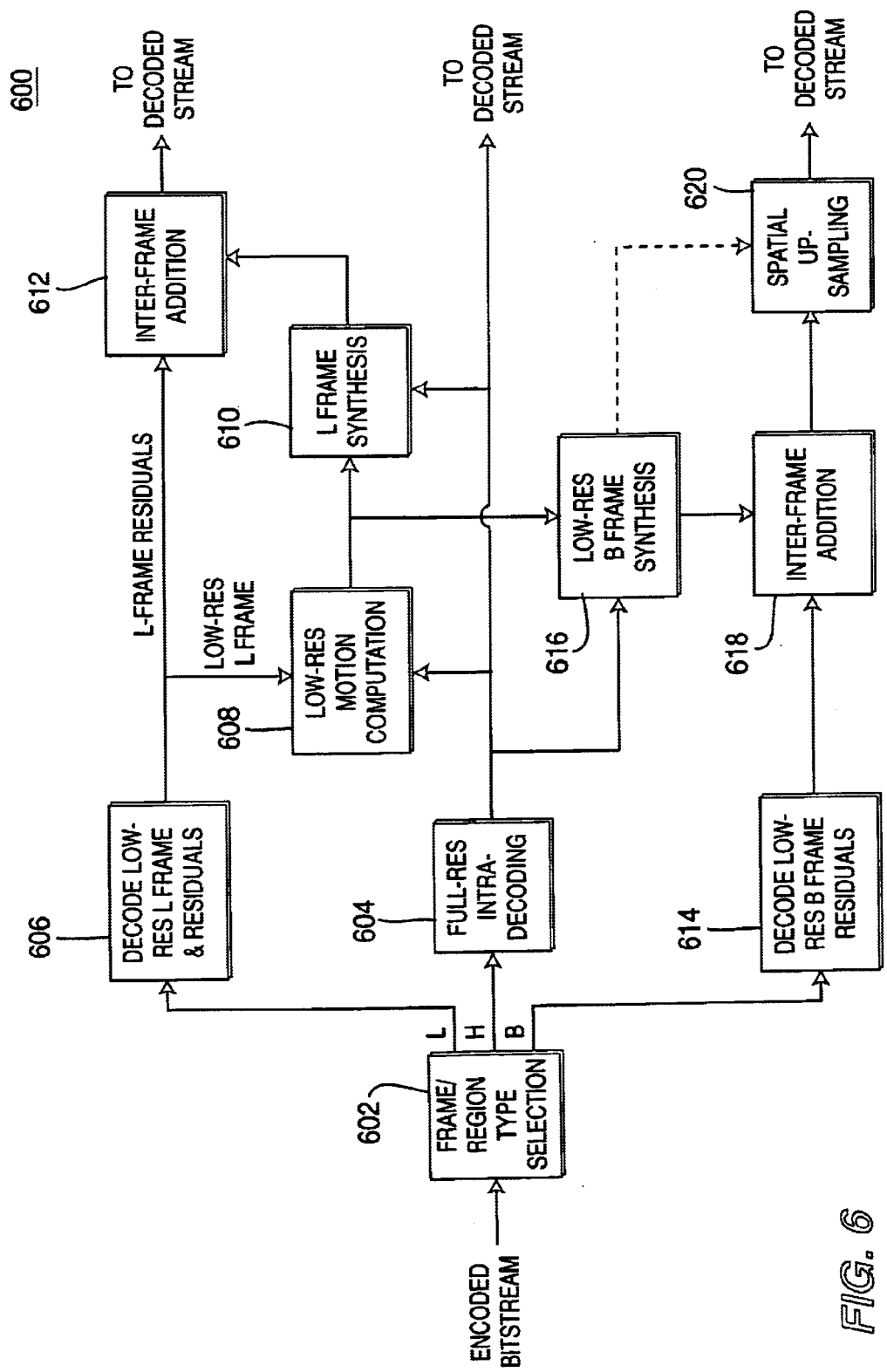
FIG. 6 shows a block diagram of a video decoder, according to one embodiment of the present invention.

FIG. 6 shows a block diagram of a video decoder 600, according to one embodiment of the present invention. Video decoder 600 decodes an encoded video bitstream generated by video encoder 100 of FIG. 1 to generate a decoded video stream. As described earlier, the encoded video bitstream generated by video encoder 100 comprises encoded data for H, L, and B frames. Video decoder 600 performs frame/region type selection (block 602 in FIG. 6) (e.g., based on header information explicitly encoded into the bitstream) to determine how to decode the various sets of encoded data. Although, as described previously, the encoder may make H/L/B selections on the basis of regions within each frame, the present discussion assumes that H/L/B selections were made by the encoder for entire frames.

For H frames, which the encoder has intra-encoded as full-resolution frames, the corresponding encoded data are decoded (e.g., using wavelet decoding) to generate a corresponding decoded full-resolution H frame for the decoded video stream (block 604). This is identical to the analogous processing performed by block 106 of video encoder 100.

Figure 7:
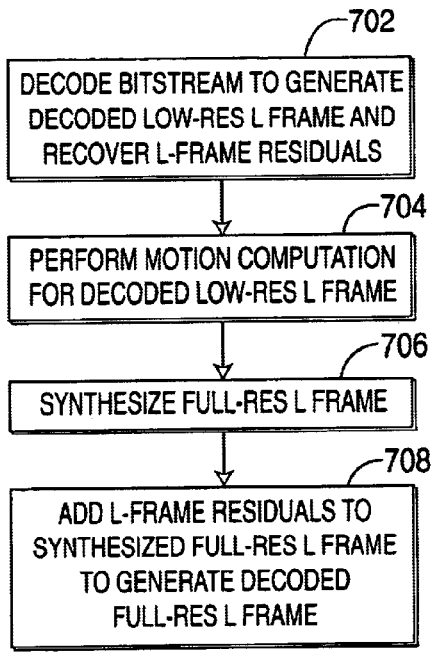
FIG. 7 shows a flow diagram of the processing of each L frame by the video decoder of FIG. 6.

FIG. 7 shows a flow diagram of the processing of each L frame by video decoder 600 of FIG. 6. The encoded data corresponding to a current L frame includes the intra-encoded low-resolution L frame data generated at block 110 of FIG. 1 as well as the encoded L-frame residual data generated at block 120. Referring to the blocks in FIG. 6 and the steps in FIG. 7, these encoded data are decoded to generate a decoded low-resolution L frame and to recover the L-frame residual data (block 606 of FIG. 6 and step 702 of FIG. 7). The generation of the decoded low-resolution L frame is identical to the analogous processing performed by block 112 of video encoder 100.

Video decoder 600 then performs motion computation for the current low-resolution L frame to generate motion information relative to one or more decoded H/L frames (block 608 and step 704). This is identical to the analogous processing performed by block 114 of video encoder 100. Since the data (e.g., the current low-resolution L frame as well as previous and/or subsequent decoded full-resolution H frames) used by the decoder to perform motion computation are identical to the data used by the encoder to perform the analogous motion computation, the motion information generated by the decoder will be identical to the motion information generated by the encoder.

This motion information is then used to synthesize a full-resolution L frame (block 610 and step 706). This is identical to the analogous processing performed by block 116 of video encoder 100. Inter-frame addition is then performed to add the recovered L-frame residuals to the synthesized full-resolution L frame to generate a decoded full-resolution L frame for the decoded video stream (block 612 and step 708).

Figure 8:
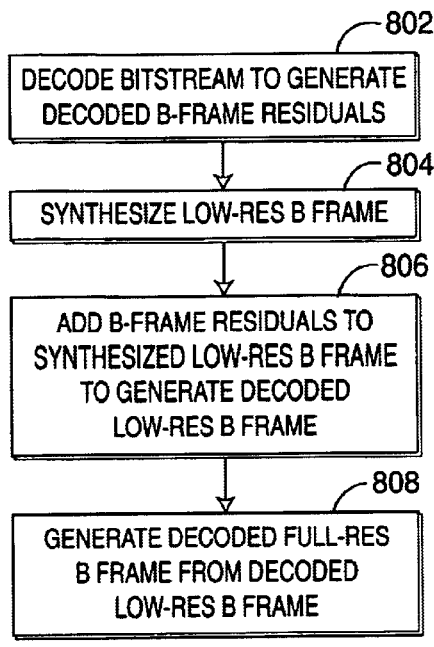
FIG. 8 shows a flow diagram of the processing of each B frame by the video decoder of FIG. 6.

FIG. 8 shows a flow diagram of the processing of each B frame by video decoder 600 of FIG. 6. The encoded data corresponding to a current B frame corresponds to the encoded B-frame residual data generated at block 128 of FIG. 1. Referring to the blocks in FIG. 6 and the steps in FIG. 8, these encoded data are decoded to recover the B-frame residual data (block 614 of FIG. 6 and step 802 of FIG. 8).

Video decoder 600 then performs tweening between decoded H and L frames to synthesize a low-resolution B frame (block 616 and step 804). This is identical to the analogous processing performed by block 124 of video encoder 100. Inter-frame addition is then performed to add the recovered B-frame residuals to the synthesized low-resolution B frame to generate a decoded low-resolution B frame (block 618 and step 806).

Spatial up-sampling is then performed on the low-resolution decoded B frame to generate a decoded full-resolution B frame for the decoded video stream (block 620 and step 808). The spatial up-sampling may rely on any suitable technique for generating a full-resolution image from low-resolution pixel data, including replication followed by spatial filtering and other suitable one- or two-dimensional linear or higher-order interpolation schemes.

Depending on the particular decoding mode, video decoder 600 can synthesize additional frames into the decoded video stream, although there will be no residual data to correct those synthesized frames, as indicated in FIG. 6 by the broken arrow from block 616 to block 620.

Since video encoder 100 is capable of encoding frames using backward and bi-directional prediction, the sequence of frames in the encoded video bitstream may differ from the sequence of frames in the input video stream. As such, video decoder 600 assembles the various decoded frames in their proper temporal order for presentation as the decoded video stream.

If, in an alternative codec algorithm, the B-frame residuals correspond to full-resolution errors rather than to low-resolution errors, then the B-frame synthesis of block 616 and step 804 would synthesize full-resolution B frames and the inter-frame addition of block 618 and step 806 would apply the full-resolution residuals to synthesized full-resolution B frames to generate decoded full-resolution B frames. In that case, the spatial up-sampling of block 620 and step 808 would not be needed.

Independent of how much motion information, if any, is encoded into the bitstream, independent of the motion computation capabilities of the decoder, independent of whether corresponding header information exists in the bitstream, and independent of whether the encoder even skipped corresponding frames when generating the bitstream, a decoder according to certain embodiments of the present invention is capable of inserting frames into the decoded video stream during playback by performing tweening between decoded frames that are explicitly decoded from the bitstream, similar to the tweening described earlier for B frames. Unlike B frames, however, in the case of inserted frames, the bitstream will not contain any residual errors for adjusting the tweened frames.

Decoding Modes

The decoder can have a number of options for decoding and playing back the encoded video bitstream. The options allow the decoder to tailor its performance adaptively according to the availability of local computational resources and the data rates supported at the incoming channel. The following is a list of some of the different possible decoding modes of operation:

1. Full Frame Rate Decoding

When the computational resources allow high performance, the decoder will decode all the H, L, and B frames as outlined above and play the incoming video stream at full resolution and at the full frame rate.

2. Adaptive Creation of B Frames

If the computational resources do not allow top-level performance, the decoder can start generating tweened B frames at a lower rate. The rate control can be based on the model of interpolation suggested by the encoder. For instance, for constant translation interpolation, a uniform rate of frame dropping may be selected.

3. H and L Frame Decoding Only

This level of operation works with H and L frames only. No tweening is performed to create B frames. L frames are synthesized to the full resolution. In extreme cases, some L frames may be dropped to maintain performance.

4. H Frame Only

In the extreme case, the decoder will resort to H-frame intra-only decoding and play the full-resolution frames as a sequence.

Other modes of operation that combine or specialize the above modes are also possible.

Compression Ratio Calculations

The following presents typical results achieved during compression processing based on the present invention. In the following, B is for bytes and b is for bits.

1. Original uncompressed video digitized as (720×486) pixel frames at 30 frames/second (fps).

349,920 pixels/frame×3 color bytes/pixel×30 fps=>uncompressed bit rate=31.493 MB/s 2. Temporal sub-sampling of frames to 5 fps (corresponding to selection of only H and L frames)

$1/6^{th}$ of 31.493 MB/s=>5.249 MB/s (for full-resolution H and L frames)

3. Spatial sub-sampling 4 out of 5 frames to ¼×¼ resolution (corresponding to spatial sub-sampling of L frames)

¼th of 5.249 MB/s=1.31 MB/s (for full-resolution H frames and low-resolution L frames)

4. Color sub-sampling of 4:1:1

½ of 1.31 MB/s=0.656 MB/s=656 KB/s

5. Wavelet intra-coding of frames+coding of residuals: Assuming 20:1 compression gain in using wavelets to encode H and L frames+10% for encoding residuals=>

1/20th of 656 KB/s+10% for encoding residuals~300 Kbps.

6. For CIF resolution (i.e., 360×243 pixel size frames)

¼ of 300 Kbps=75 Kbps

Therefore, for channels with a bandwidth of a few 100 s of Kbps, the above technique will be quite viable and will produce results of quality superior to that of conventional codecs. For channels with lower bandwidth, for example 56K modems, further sub-sampling in time may be done with some loss of quality or CIF resolution may be transmitted. For higher bandwidth channels, further quality improvement may be obtained by synthesizing B frames at the time of encoding and encoding residuals between the synthesized and original B frames, e.g., using wavelet encoding.

Applications of Generalized Motion Computation at the Decoder (Client) End

The video compression/decompression scheme described above changes the traditional paradigm of video codecs. Motion computation capability at the decoder end enables highly scaleable coding for a wide range of channel bandwidths. However, video compression is not the only capability enabled by generalized motion computation capability at the decoder end. A number of innovative capabilities are described in this section.

1. De-interlacing On-the-fly

Since field-to-field motion is computed at the decoder end, when the motion is per pixel, the motion field can be used to dynamically compensate for inter-field motion and create de-interlaced video without the necessity of any other special-purpose hardware. Such de-interlacing can be used to transparently convert interlaced video for display on progressive scan displays. The following steps for doing this are all enabled by the generalized decoder described earlier.

Compute motion between fields.

Warp one field towards the other using flow-based warping.

Combine the two motion-compensated fields to generate a full progressive frame.

2. New View Generation On-the-fly

Another attractive application is the generation of novel views given the encoded frames in the video stream. Motion estimation capability at the client/decoder end allows generation of frames that are not a part of the original stream by interpolating between two or more original frames using the motion fields. In the case of video decoding, this capability may be used to generate a full frame-rate video stream from a temporally sub-sampled stream on-the-fly. The same technique enables user-controlled generation of new frames either for higher-than-normal frame rates or for providing an experience of navigating through the environment.

Consider an immersive reality application in which synchronized video streams are capturing a dynamic event from many different viewpoints using a number of cameras. Each of the cameras captures the event from its own viewpoint. The collection of video streams is multiplexed and compressed onto a single encoded video bitstream and transmitted to any number of clients who wish to experience virtual presence at the site of the event. The same decoder capabilities outlined above will allow a system to decode the multiplexed and time-stamped video streams and spatially "tween" between close-by cameras to allow the user to view the same event at any time instant from different angles simultaneously. That is, the user is not only able to see a linear traditional video of the event, but also freeze any time instant and maneuver around the event in space and time. In fact, the user can be provided virtual navigational capability to navigate seamlessly in space and time.

Figure 9:
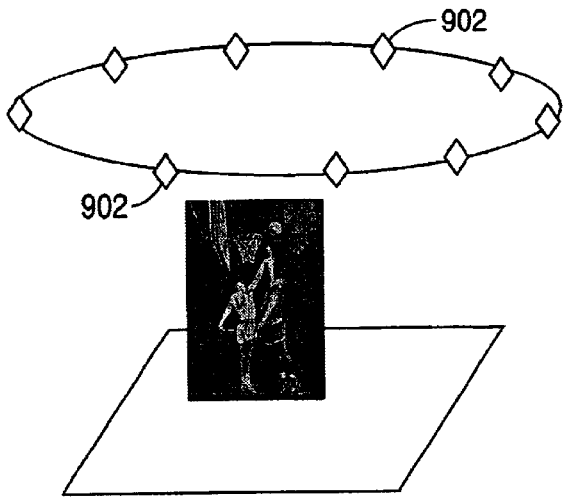
FIG. 9 represents a basketball event being covered by a ring of cameras.
Figure 10:
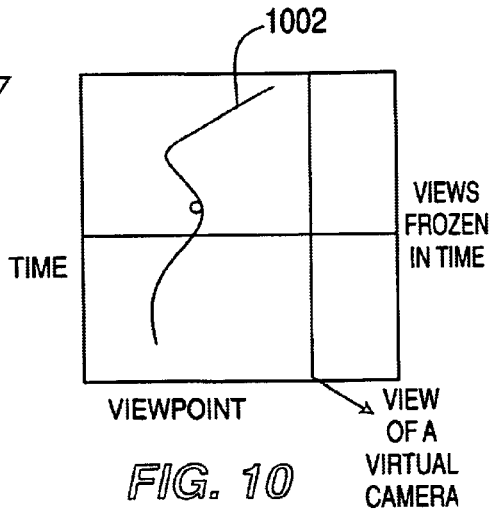
FIG. 10 represents a space-time continuum of views along the ring of cameras of FIG. 9.

For illustrative purposes, consider that a basketball event is being covered by a ring of cameras 902 with reasonable spacing between them, as represented in FIG. 9. The continuum of views along the ring of cameras can be parameterized, with viewpoint plotted along the horizontal axis and time plotted along the vertical axis, as represented in FIG. 10. The user may specify any given point in this space-time domain and the video decoder/renderer will render the view from the specified viewpoint and at the specified time. In general, a trajectory (e.g., curve 1002 in FIG. 10) through this space-time (i.e., XYZT) domain corresponds to a user moving in the space of views and in time. In addition, any number of viewers can do this independently and at will.

3. Generalization to Dynamic 3D Viewing under User Control

The above concept of a video decoder as a user-controlled navigator of environments can be further generalized to provide arbitrary detailed coverage of an environment for remote tele-presence (being there) experiences. Consider a dynamic and complex 3D environment such as the Golden Gate Bridge and its surroundings. Viewers can be provided with an immersive highly photo-realistic experience of being there from their living rooms in real time. That is, any number of users can experience their own individual presence through joy-stick-like controls. Everyone sees what they want to see and from what viewpoint.

There are four main generalizations of the streaming video concept described above:

(i) The video encoder is a video and dynamic 3D information encoder.

(ii) The encoded stream is a multiplexed and encoded stream that encodes not just individual frames but shape maps, moving objects, and the background and other scene-related and object-related information.

(iii) The video decoder is a decoder and an image-based renderer.

(iv) XYZT space-time matrix user interface.

The details of each of these generalizations are outlined in the following sections.

(i) Dynamic 3D Creator

Each of the real camera views is encoded using wavelet encoding. In addition, the local shape information may be encoded. The shape information may include range/parallax maps, moving object versus static scene layers, foreground/background masks, and the like (ii) Dynamic 3D Encoded Stream.

Instead of transmitting motion vectors and error residuals as is done in the current MPEGx and related streams, the dynamic 3D stream consists of intra-coded frames, and also wavelet-coded range/parallax maps and object and scene layers. Streams from many different cameras and sensors are multiplexed together with time stamps.

(iii) Client End Video Decoder/Renderer

The video decoder described earlier for the new streaming video application is generalized here to a video decoder and an image-based renderer. All the intra-coded frames are decoded under user control. Furthermore, the shape and layer masks are decoded, and inter-frame motion is computed wherever necessary. A continuous stream of user-controlled novel views is generated by shape-based and motion-based tweening using the time-stamped real views.

(iv) XYZT Space-Time Matrix User Interface

User navigation in the generalized viewing case can be facilitated by a four-dimensional XYZT "cube" that represents the space-time domain of viewing. In addition, for any given viewpoint, pan, tilt, and zoom capabilities can also be provided.

4. Real-Time Compositing of Real and Synthetic Content

Another attractive application of the proposed generalized codec scheme is the ability to composite real video content with synthetic 2D and 3D content for on-the-fly rendering at the client end. Since the dynamic 3D content is encoded at the content creation end in terms of foreground, background, and motion layers, compositing capability can be provided at the viewing (i.e., decoding) end. For instance, virtual billboards could be seamlessly inserted into real video streams for targeted marketing. Similarly on-the-fly special effects may be created by inserting synthetic animated characters into the layered video stream or by replacing real objects (like faces) by the virtual objects.

Although the present invention has been described in the context of encoding H frames as full-resolution frames, in alternative embodiments, H frames may be encoded as high-resolution frame, whose resolution is lower than that of the original full-resolution H frames, but still higher than that of the low-resolution L and B frames.

Although the encoding of the H/L-frame pixel data and B-frame residual error data has been described as being based on wavelet encoding, those skilled in the art will understand that some or all of the wavelet-based encoding may be replaced by other suitable encoding techniques. For example, the encoding could be based on the application of a block-based discrete cosine transform (DCT) following by quantization, run-length encoding, and variable-length encoding.

Although the present invention has been described in the context of a video frame as a single entity, those skilled in the art will understand that the invention can also be applied in the context of interlaced video streams and associated field processing. As such, unless clearly inappropriate for the particular implementation described, the term "frame," especially as used in the claims, should be interpreted to cover applications for both video frames and video fields.

The present invention may be implemented as circuit-based processes, including possible implementation on a single integrated circuit. As would be apparent to one skilled in the art, various functions of circuit elements may also be implemented as processing steps in a software program. Such software may be employed in, for example, a digital signal processor, micro-controller, or general-purpose computer.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A method for encoding a video stream to generate an encoded video bitstream, comprising the steps of:

(a) encoding, into the encoded video bitstream, a first original frame/region in the video stream using intra-frame coding to generate an encoded first frame/region; and (b) encoding, into the encoded video bitstream, a second original frame/region in the video stream using motion-based predictive coding, wherein:

the motion-based predictive coding comprises motion computation adapted to generate motion information using during the motion-based predictive coding; and at least some of the motion information used during the motion-based predictive coding is excluded from the encoded video bitstream.

2. The invention of claim 1, wherein all of the motion information used during the motion-based predictive coding is excluded from the encoded video bitstream and the encoded video bitstream does not explicitly include any motion information.

3. The invention of claim 1, wherein step (b) comprises the steps of:

(1) decoding the encoded first frame/region to generate a decoded first frame/region;

(2) encoding the second original frame/region to generate an encoded second frame/region;

(3) decoding the encoded second frame/region to generate a decoded second frame/region;

(4) performing motion computation between the decoded second frame/region and the decoded first frame/region to generate the motion information;

(5) applying the motion information to the decoded first frame/region to generate a synthesized second frame/region;

(6) performing inter-frame differencing between the synthesized second frame/region and the second original frame/region to generate residual errors; and (7) encoding, into the encoded video bitstream, at least some of the residual errors.

4. The invention of claim 1, further comprising the step of:
(c) encoding, into the encoded video bitstream, a third original frame/region in the video stream using tweening based on the motion information used to encode the second original frame/region.

5. The invention of claim 1, wherein the motion-based predictive coding comprises:
motion computation during which one or more motion vectors are determined for the second original frame/region; and
motion compensation based on the one or more motion vectors determined during motion computation, wherein at least one of the motion vectors used during the motion compensation is excluded from the encoded video bitstream.

6. The invention of claim 5, wherein each motion vector used during the motion compensation is excluded from the encoded video bitstream.

7. A video encoder for encoding a video stream to generate an encoded video bitstream, comprising:
(a) a frame/region type selector configured for selecting different processing paths for encoding different frames/regions into the encoded video bitstream;
(b) a first processing path configured for encoding, into the encoded video bitstream, a first original frame/region in the video stream using intra-frame coding to generate an encoded first frame/region; and
(c) a second processing path configured for encoding, into the encoded video bitstream, a second original frame/region in the video stream using motion-based predictive coding, wherein:
the motion-based predictive coding comprises motion computation adapted to generate motion information using during the motion-based predictive coding; and
the video encoder has an encoding mode in which at least some of the motion information used during the motion-based predictive coding is excluded from the encoded video bitstream.

8. The invention of claim 7, wherein the video encoder is a scaleable video encoder that can be operated at a plurality of different encoding modes, wherein:
in a first encoding mode, all of the motion information is excluded from the encoded video bitstream and the encoded video bitstream does not explicitly include any motion information; and
in a second encoding mode, at least some of the motion information is encoded into the encoded video bitstream.

9. The invention of claim 8, wherein:
in the second encoding mode, a first portion of the motion information is encoded into the encoded video bitstream and a second portion of the motion information is excluded from the encoded video bitstream; and
in a third encoding mode, all of the motion information is encoded into the encoded video bitstream.

10. The invention of claim 7, wherein:
the first processing path is configured for decoding the encoded first frame/region to generate a decoded first frame/region; and
the second processing path is configured for:
(1) encoding the second original frame/region to generate an encoded second frame/region;
(2) decoding the encoded second frame/region to generate a decoded second frame/region;
(3) performing motion computation between the decoded second frame/region and the decoded first frame/region to generate the motion information;
(4) applying the motion information to the decoded first frame/region to generate a synthesized second frame/region;
(5) performing inter-frame differencing between the synthesized second frame/region and the second original frame/region to generate residual errors; and
(6) encoding, into the encoded video bitstream, at least some of the residual errors.

11. The invention of claim 10, wherein the encoding in the first processing path and the encoding of the second original frame/region in the second processing path are based on intra-frame wavelet encoding.

12. The invention of claim 10, wherein:
the first processing path is configured for intra-frame coding the first original frame/region at a high resolution;
the decoded first frame/region is at the high resolution;
the second processing path is configured for:
(i) spatially sub-sampling the second original image/region to generate a low-resolution second frame/region having a resolution lower than the high resolution; and
(ii) intra-frame coding the low-resolution second frame/region to generate the encoded second frame/region;
the decoded second frame/region is at the low resolution; and
the synthesized second frame/region is at the high resolution.

13. The invention of claim 10, wherein the second processing path is configured for:
(i) thresholding the residual errors to generate binary data; and
(ii) encoding, into the encoded video bitstream, the at least some of the residual errors based on the binary data.

14. The invention of claim 7, further comprising a third processing path configured for encoding, into the encoded video bitstream, a third original frame/region in the video stream using tweening based on the motion information used to encode the second original frame/region.

15. The invention of claim 14, wherein:
the first processing path is configured for decoding the encoded first frame/region to generate a decoded first frame/region; and
the third processing path is configured for:
(1) temporally interpolating the motion information used to encode the second original frame/region;
(2) applying the temporally interpolated motion information to the decoded first frame/region to generate a synthesized third frame/region;
(3) generating residual errors between the synthesized third frame/region and the third original frame/region; and
(4) encoding, into the encoded video bitstream, at least some of the residual errors.

16. The invention of claim 15, wherein:
the first processing path is configured for intra-frame coding the first original frame/region at a high resolution;
the decoded first frame/region is at the high resolution;
the synthesized third frame/region is at the high resolution; and the third processing path is configured for performing inter-frame differencing between the synthesized third frame/region and the third original frame/region to generate the residual errors.

17. A method for decoding an encoded video bitstream to generate a decoded video stream, comprising the steps of:

(a) decoding, from the encoded video bitstream, an encoded first frame/region using intra-frame decoding to generate a decoded first frame/region; and (b) decoding, from the encoded video bitstream, an encoded second frame/region using motion-based predictive decoding, wherein at least some motion information used during the motion-based predictive decoding is generated by performing motion computation as part of the decoding method.

18. The invention of claim 17, wherein the encoded video bitstream does not explicitly include any motion information and all of the motion information used during the motion-based predictive decoding is generated as part of the method.

19. The invention of claim 17, wherein step (b) comprises the steps of:

(1) decoding, from the encoded video bitstream, the encoded second frame/region to generate a decoded second frame/region;

(2) performing the motion computation between the decoded second frame/region and the decoded first frame/region to generate the motion information;

(3) applying the motion information to the decoded first frame/region to generate a synthesized second frame/region;

(4) decoding, from the encoded video bitstream, encoded residual errors to generate decoded residual errors corresponding to the synthesized second frame/region; and (5) performing inter-frame addition between the decoded residual errors and the synthesized second frame/region to generate an error-corrected decoded second frame/region.

20. The invention of claim 17, further comprising the step of:

(c) generating a decoded third frame/region using tweening based on the motion information used to decode the encoded second frame/region.

21. The invention of claim 17, further comprising the step of de-interlacing a decoded second frame/region generated during step (b) to generate two corresponding fields corresponding to the decoded second frame/region.

22. A video decoder for decoding an encoded video bitstream to generate a decoded video stream, comprising:

(a) a frame/region type selector configured for selecting different processing paths for decoding different encoded frames/regions from the encoded video bitstream;

(b) a first processing path configured for decoding, from the encoded video bitstream, an encoded first frame/region in the video stream using intra-frame decoding to generate a decoded first frame/region; and (c) a second processing path configured for decoding, from the encoded video bitstream, an encoded second frame/region in the video stream using motion-based predictive decoding, wherein the video decoder has a decoding mode in which at least some motion information used during the motion-based predictive decoding is generated by the video decoder performing motion computation.

23. The invention of claim 17, wherein the motion-based predictive decoding further comprises motion compensation for the encoded second frame/region based on one or more motion vectors, wherein at least one of the motion vectors used during the motion compensation is determined during the motion computation.

24. The invention of claim 23, wherein each motion vector used during the motion compensation is determined during the motion computation.

25. The invention of claim 22, wherein the video decoder is a scaleable video decoder that can be operated at a plurality of different decoding modes, wherein:

in a first decoding mode, the encoded video bitstream does not explicitly include any motion information and all of the motion information is generated by performing the motion computation by the video decoder; and in a second decoding mode, at least some of the motion information is decoded from the encoded video bitstream.

26. The invention of claim 25, wherein:

in the second decoding mode, a first portion of the motion information is decoded from the encoded video bitstream and a second portion of the motion information is generated by performing the motion computation by the video decoder; and in a third decoding mode, all of the motion information is decoded from the encoded video bitstream.

27. The invention of claim 22, wherein:

the second processing path is configured for:

(1) decoding, from the encoded video bitstream, the encoded second frame/region to generate a decoded second frame/region;

(2) performing the motion computation between the decoded second frame/region and the decoded first frame/region to generate the motion information;

(3) applying the motion information to the decoded first frame/region to generate a synthesized second frame/region;

(4) decoding, from the encoded video bitstream, encoded residual errors to generate decoded residual errors corresponding to the synthesized second frame/region; and (5) performing inter-frame addition between the decoded residual errors and the synthesized second frame/region to generate an error-corrected decoded second frame/region.

28. The invention of claim 27, wherein the decoding in the first processing path and the decoding of the second encoded frame/region in the second processing path are based on intra-frame wavelet decoding.

29. The invention of claim 27, wherein:

the decoded first frame/region is at a high resolution;

the decoded second frame/region is at a low resolution lower than the high resolution;

the synthesized second frame/region is at the high resolution; and the error-corrected decoded second frame/region is at the high resolution.

30. The invention of claim 22, further comprising a third processing path configured for generating a decoded third frame/region using tweening based on the motion information used to decode the encoded second frame/region.

31. The invention of claim 30, wherein the third processing path is configured for:

(1) temporally interpolating the motion information used to decode the encoded second frame/region; and (2) applying the temporally interpolated motion information to the decoded first frame/region to generate the decoded third frame/region.

32. The invention of claim 31, wherein the decoded third frame/region is not explicitly represented in the encoded video bitstream.

33. The invention of claim 31, wherein the third processing path is configured for:
   (i) applying the temporally interpolated motion information to the decoded first frame/region to generate a synthesized third frame/region;
   (ii) decoding, from the encoded video bitstream, encoded residual errors for an encoded third frame/region to generate decoded residual errors; and
   (iii) applying the decoded residual errors to the synthesized third frame/region to generate the decoded third frame/region.

34. The invention of claim 33, wherein:

the decoded first frame/region is at a high resolution;

the synthesized third frame/region is at the high resolution; and the third processing path is configured for performing inter-frame addition between the synthesized third frame/region and the decoded residual errors to generate the decoded third frame/region at the high resolution.

35. The invention of claim 22, wherein the second processing path is configured for de-interlacing a decoded second frame/region to generate two corresponding fields corresponding to the decoded second frame/region.

* * * * *